United States Patent Office 2,787,629
Patented Apr. 2, 1957

2,787,629

BIS(CHLOROMETHANE ALKYL) PHOSPHONIC ACID ANHYDRIDES

Harry W. Coover, Jr., and Joseph B. Dickey, Kingsport, Tenn., assignors to Eastman Kodak Company, Rochester, N. Y., a corporation of New Jersey No Drawing. Application December 24, 1952, Serial No. 327,924

9 Claims. (Cl. 260—461)

This invention relates to certain new organophosphorous compounds and to a method of preparing them. More particularly, this invention relates to the process of reacting dialkylchloromethanephosphonates and organic acid anhydrides, and the resulting compounds, which we have found to possess valuable insecticidal properties.

We have discovered that the dialkylchloromethanephosphonates react with organic acid anhydrides to give the corresponding esters of the organic acid anhydride plus an organic phosphorus compound containing less alkyl groups per phosphorus molecule. The exact structure of the phosphorus compounds is not known. However, the principal reaction product is thought to be an alkylchloromethanepyrophosphate which may also be called a bis (chloromethane alkyl) phosphonic acid anhydride having the structural formula:

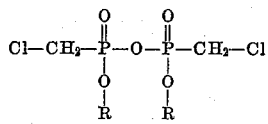

wherein R is an alkyl group of 1 to 4 carbon atoms. The conditions for running the reaction consist of mixing the desired quantities of dialkylchloromethanephosphonate and an organic acid anhydride, and heating until the required amount of organic acid ester is formed. In general, it is simplest to distill the ester from the reaction mixture as rapidly as it is formed. The reaction is greatly speeded up by the addition of small amounts of catalyst such as on the order of 0.001–1% of the organic and inorganic acids, the boron compounds or the metallic chlorides based on the weight of the mixture of dialkylchloromethanephosphonates and organic acid anhydrides, although in some cases as much catalyst as 5% may be employed. Although the reaction will progress in the absence of catalyst, we have found that ordinarily the best results are obtained when the reaction is speeded up and, hence, the use of catalyst is preferred. Organic and inorganic acids are good catalysts. Boron trifluoride, boron trifluoride etherate, boric acid esters and anhydrides and such compounds as stannic chloride, zinc chloride, and aluminum chloride are also very effective catalysts. We refer to these useful catalysts as "acid type" catalysts.

Accordingly, it is an object of our invention to provide a novel process comprising reacting dialkylchloromethanephosphonates with organic acid anhydrides. Another object resides in the provision of the resulting products.

The invention will be further illustrated by the following examples:

Example 1

One-tenth mole of diethylchloromethanephosphonate, 0.1 mole of acetic anhydride, and a trace of boron trifluoride etherate were placed in a distillation flask. The reaction mixture was heated in an oil bath at 150–160° C. (bath temperature) for 3 hours. At the end of this time, 0.1 mole of ethyl acetate had distilled from the reaction mixture. The remaining product was a clear, slightly viscous liquid and was found to possess good insecticidal properties.

Example 2

One mole of dibutylchloromethanephosphonate, 1 mole of acetic anhydride and a trace of concentrated sulfuric acid were placed in a distillation flask. The reaction mixture was heated in an oil bath at 150–180° C. (bath temperature) for 4–5 hours. At the end of this time, one mole of butyl acetate had distilled from the reaction mixture. The reaction product was a light yellow liquid having good insecticidal properties.

Example 3

One mole of dimethylchloromethanephosphonate, 1 mole of propionic anhydride, and a trace of boric acid anhydride were placed in a distillation flask. The reaction mixture was heated in an oil bath at 150–160° C. (bath temperature) for 3 hours. At the end of this time, one mole of methylpropionate had distilled from the reaction mixture. The remaining product was a clear liquid possessing good insecticidal properties.

Among the organic acids which can be used as catalysts in the reaction are the following: acetic, propionic, butyric, chloroacetic, trichloroacetic, trifluoroacetic, and the like.

Among the inorganic acids which can be used as catalysts in the reaction are the following: sulfuric, hydrochloric, hydrofluoric, boric, phosphoric, and the like.

While the reaction described herein is operative with dialkylchloromethanephosphonates containing other alkyl groups, we prefer to use compounds containing the lower alkyl radicals having from one to four carbon atoms.

Examples of organic acid anhydrides useful in place of acetic anhydride are: propionic anhydride, butyric anhydride, chloroacetic anhydride, trichloroacetic anhydride, trifluoroacetic anhydride, and the like.

The insecticidal value of the organo-phosphorus compounds is shown by various tests carried out by contacting insects with these compounds. For instance, by preparing a dust of the organo-phosphorus compound in an inert carrier such as pyrophyllite, and after placing fruit flies in a bottle, sprinkling with the dust and observing the flies at intervals, it may be seen that 100% kill of these fruit flies is obtained in a short time. Another method of determining the effectiveness of this compound as an insecticide, is to dip a piece of filter paper into a solution of the compound in an organic solvent, allowing the paper to dry, and placing the same in a jar containing fruit flies. One hundred percent kill is obtained in a very short time with the organophosphorus compounds.

The insecticidal compositions in accordance with our invention are effective against various other insect pests such as house flies, silver fish, bean beetles, fleas, cucumber beetles, aphids, red spiders and other mites, thrips, etc.

We have found that petroleum distillates are particularly effective as solvents in preparing the organo-phosphorus insecticidal compositions, such as petroleum hydrocarbons having a boiling range of 80 to 150° C. For dusting compositions, we have found pyrophyllite to be of advantage as a carrier for the organo-phosphorus compounds.

The following examples illustrate compositions in accordance with our invention which are particularly effective for insecticidal purposes:

Example 4

The following is an example of insecticidal compositions in which other materials having insecticidal properties are incorporated:

|  | Percent |
|---|---|
| Organo-phosphorus compound | 2.0 |
| Pyrethrin extract | 0.2 |
| Piperonyl butoxide | 1.0 |
| Petroleum distillate | 12.0 |
| Inert propellent | 84.8 |

Example 5

Instead of using a propellent, the composition of the organo-phosphorus compound in a petroleum distillate may be emulsified in water by means of an emulsifying agent such as whale oil soap, ordinary soap, sodium lauryl sulfate, or the like.

Example 6

A particularly effective insecticidal dusting compound is obtained by incorporating 5-10% of the organo-phosphorus compound in 90-95% of pyrophyllite in a finely divided form.

We claim:

1. A process of preparing insecticidal organic phosphorus compounds comprising heating together a dialkylchloromethanephosphonate, the alkyl being of 1-4 carbon atoms, with a lower aliphatic acid anhydride at about 150–180° C.

2. A process according to claim 1 carried out in contact with an acid-type catalyst.

3. As new compounds, bis(chloromethane alkyl) phosphonic acid anhydrides wherein the alkyls are of 1-4 carbons.

4. A process according to claim 1 wherein the phosphonate is diethylchloromethanephosphonate and the anhydride is acetic anhydride.

5. A process according to claim 1 wherein the phosphonate is dibutylchloromethanephosphonate and the anhydride is acetic anhydride.

6. A process according to claim 1 wherein the phosphonate is dimethylchloromethanephosphonate and the anhydride is propionic anhydride.

7. Insecticidal compositions comprising 5-10% of bis(chloromethane alkyl) phosphonic acid anhydrides wherein the alkyl is of 1 to 4 carbon atoms, plus 90-95% of pyrophyllite in a finely divided form.

8. A compound according to claim 3 wherein the alkyl radical is ethyl.

9. A compound according to claim 3 wherein the alkyl radical is butyl.

References Cited in the file of this patent
UNITED STATES PATENTS

| 2,485,573 | Craig et al. | Oct. 25, 1949 |
| 2,573,568 | Harman et al. | Oct. 30, 1951 |
| 2,599,761 | Harman et al. | June 10, 1952 |
| 2,600,378 | Dickey et al. | June 17, 1952 |